(12) United States Patent
Barton et al.

(10) Patent No.: US 7,513,517 B2
(45) Date of Patent: Apr. 7, 2009

(54) BAR PIN ATTACHMENT FOR BUSH ASSEMBLY

(75) Inventors: Bruce Barton, Springfield, MO (US); William Mattocks, Springfield, MO (US); Craig Baird, Springfield, MO (US); Mark Holt, Springfield, MO (US)

(73) Assignee: Ridewell Corporation, Springfield, MO (US)

( * ) Notice: Subject to any disclaimer, the term of this patent is extended or adjusted under 35 U.S.C. 154(b) by 427 days.

(21) Appl. No.: 11/342,978

(22) Filed: Jan. 30, 2006

(65) Prior Publication Data

US 2007/0176385 A1 Aug. 2, 2007

Related U.S. Application Data

(60) Provisional application No. 60/647,913, filed on Jan. 28, 2005.

(51) Int. Cl.
*B60G 9/00* (2006.01)
(52) U.S. Cl. ............................................. 280/124.116

(58) Field of Classification Search .............. 280/86.75, 280/86.751, 86.753, 124.11, 124.116, 124.117
See application file for complete search history.

(56) References Cited

U.S. PATENT DOCUMENTS

| | | | | |
|---|---|---|---|---|
| 6,367,826 B1* | 4/2002 | Klais | ...................... | 280/86.751 |
| 6,843,490 B2* | 1/2005 | Raidel et al. | .......... | 280/124.116 |
| 7,210,692 B2* | 5/2007 | Galazin | ................... | 280/86.75 |
| 7,296,809 B2* | 11/2007 | Zebolsky | ................ | 280/86.75 |
| 2005/0023790 A1* | 2/2005 | Galazin | ............... | 280/124.116 |

* cited by examiner

*Primary Examiner*—Faye M. Fleming
(74) *Attorney, Agent, or Firm*—Lathrop & Gage LLP

(57) ABSTRACT

The present invention provides a bar pin attachment for bush assembly. The assembly comprises a longitudinally extending control arm, a bush eye clamp, and a hanger bracket. The control arm has a bush end, a mid-region, an axle mount formed opposite of the bush end. A bush, having an integral bar pin molded laterally therethrough, is inserted in the bush eye and retained therein. The hanger bracket is attached to, and depends from, the chassis and includes two spaced-apart, downward oriented flanges between which the bush eye clamp is positioned. The bush end is pivotally attached to the hanger by fastening the bar pin ends directly to each adjacent hanger flange.

20 Claims, 4 Drawing Sheets

BAR PIN ATTACHMENT FOR BUSH ASSEMBLY

RELATED APPLICATIONS

This non-provisional application claims priority to U.S. provisional patent application Ser. No. 60/647,913 filed Jan. 28, 2005 and entitled "Bar Pin Attachment for Bush Assembly", the contents of which are incorporated herein by reference.

FIELD OF THE INVENTION

The present invention is directed to vehicle suspension components, and more particularly, to a beam and bush assembly wherein the bush assembly is attached directly to a suspension hanger with a bar pin.

BACKGROUND

A variety of devices have been designed and used to attach a vehicle suspension systems between the vehicle body and an axle. Many vehicles employ suspension systems utilizing longitudinally extending trailing beams or rocker beams, also known as control arms. These beams are typically pivotally connected to the vehicle chassis or frame undercarriage at a first end, and attached to a transversely mounted axle at or near a second end. The first end may include a suspension bushing mounted within a suspension hanger depending from the vehicle frame.

For each axle, one beam is generally located near each of the left and right sides of the vehicle. Often, a suspension member, such as an air spring, leaf spring or coil spring, is positioned between the vehicle chassis and the axle mounting end of the suspension beam. In this configuration, when the vehicle axle encounters a rough surface and is displaced by movement of the tires attached thereto, the suspension member can manage the magnitude and speed of the displacement of the control arm while such beam pivots about the first end pivot connection.

A strong yet resilient first end pivot connection is critical to suspension performance because of loads imparted on the pivot end during suspension actuation and side or lateral loading which occurs as the vehicle turns. Current trends in heavy vehicle suspension designs include providing a generally annular resilient bushing mounted within an annular housing at the first end of the suspension beam. The bushing has a laterally positioned bore which, when the bushing is positioned within a suspension hanger, aligns with openings formed in both sides of the hanger. Generally, the bush is fastened within the hanger by passing a bolt through the hanger walls and the bushing bore. Some designs include an elongated bolt opening in each hanger wall to facilitate alignment of the suspension arm respective to the vehicle chassis.

The bush, often made from a hyperelastic material, is subject to periodic replacement due to wear and aging. Excessive wearing of the bush also occurs when the bolt securing it within the hanger has unwanted movement, often created by wear and tear or due to the bolt becoming loose during suspension movement. It is desirable to firmly secure the bush within the housing to limit wear and to eliminate unwanted movement of the bush within the suspension hanger which may affect suspension alignment. It is further desirable to mold the bush directly to the through bar, in this inventive device, a bar pin.

Another problem inherent in known suspension systems arises from the industry desire to decrease overall suspension weight and cost. Low weight and cost effective unitized suspension systems often include first pivot end bush housings without adjustments which makes bush replacement difficult, and often lead to premature replacement of the entire system when only bush replacement was necessary. Thus, it is desired to have a suspension system providing ease in bush replacement without necessitating the replacement of the whole system, and without requiring the use of specialized tools or equipment.

Hence, there is a need for an apparatus and and method for securing a bar pin end within a bush assembly and suspension hanger that overcomes one or more of the drawbacks identified above.

SUMMARY

The present disclosure advances the art and overcomes problems articulated above by providing a bar pin attachment for bush assembly utilizing control arms with an integral bush eye with a bush positioned therein and which includes a bar pin positioned through the bush. It is preferred that the bar pin is molded directly within the bush to form a unitized bush/bar pin assembly. Further, a fastener is provided at each opposed end of the bar pin whereby the bar pin is connected directly to flanges on the hanger bracket. The invention may also include an integral bush eye clamp and fastening bracket for easy removal and replacement of a pivot bush.

As is customary in trailing arm suspension applications, the first or forward end of the control arm comprises a bush mounted within a bush housing and suspended from a hanger assembly attached to the vehicle chassis. The beam then extends rearward for connection to a vehicle axle. It is understood that the suspension system includes a pair of spaced apart control arms positioned proximate each side of the vehicle oriented perpendicular to the transversely extending axle.

Each control arm extends longitudinally along the vehicle and incorporates a bush end, a mid-region, and an axle mount spaced from the bush end by the mid-region therebetween. At the bush end, the bush eye clamp has a generally annular cross-section and is sized to receive a resilient bush for pivotal attachment to the suspension hanger bracket. The hanger bracket may include a separate mounting plate for securing the bracket to the vehicle chassis. In this embodiment, two spaced-apart flanges depend generally downward from the mounting plate, or the hanger bracket itself, to be positioned on either side of the bush eye clamp which is fastened there between. Each of the spaced-apart flanges is provided with a fastener or a fastener opening through which a fastener is secured.

The bush is placed within the bush eye and, in the preferred embodiment, is compressed within the bush eye clamp. The assembly is then positioned between the spaced-apart flanges of the hanger bracket. A bar pin may be inserted through a bore provided in the bush. It is preferred, however, that the bar pin be molded directly through the lateral faces of the bush during the bush molding or forming process such that the bar pin is integral with the bush. When the bush is placed in the bush eye, the bar pin extends laterally beyond each opposing face of the bush and each end of the bar pin is provided with a fastener or fastener opening through which a fastener may be secured.

In one configuration, each bar pin end and each suspension hanger flange is provided with fastener openings. A bolt or similar other fastener may be passed completely through the bar pin and flange and secured with a nut or similar fastener. In another configuration, each flange is provided with a threaded stud which is positioned through the opening on an end of the bar pin and fastened.

In a second embodiment, the spaced apart hanger flanges further comprise a forward flange tab and a spaced apart rearward flange tab. The bar pin end is positioned intermediate the forward and rearward flange tabs and fastened therebetween with conventional fasteners. Shims may be added between the forward flange tab and the bar pin end or the rearward flange tab and the bar pin end to adjust alignment of the axle relative to the vehicle chassis.

The control arm may take on a variety of shapes, such as a closed or boxed cross-section that has upper and lower member plates and side plates to provide load carrying capability. It is contemplated that the inventive bar pin attachment assembly may be configured with a variety of suspension configurations including cast or formed suspensions or combinations thereof.

The present invention provides a control arm and bush attachment assembly that provides ease and inexpensive servicing of the bush. By fastening the bush directly to the suspension hanger with a bar pin, excess lateral bush movement is eliminated thereby increasing the efficiency and longevity of the bush and hanger assembly.

DETAILED DESCRIPTION

Before proceeding with the detailed description, it is to be appreciated that the present teaching is by way of example, not by limitation. The concepts herein are not limited to use or application with one specific type of beam and bush assembly. Thus, although the instrumentalities described herein are for the convenience of explanation, shown and described with respect to exemplary embodiments, it will be appreciated that the principles herein may be equally applied in other types of beam and bush assemblies.

This suspension system is designed for installation on a vehicle, preferably heavy trucks, trailers and commercial equipment, having a pair of substantially parallel chassis side rails. It is understood that the suspension assembly is substantially duplicated on both sides of the chassis with the axle as well as the chassis being similarly connected to both assemblies. Since each bush clamp assembly is substantially identical, only a single assembly will be described in detail herein.

Figure 1:
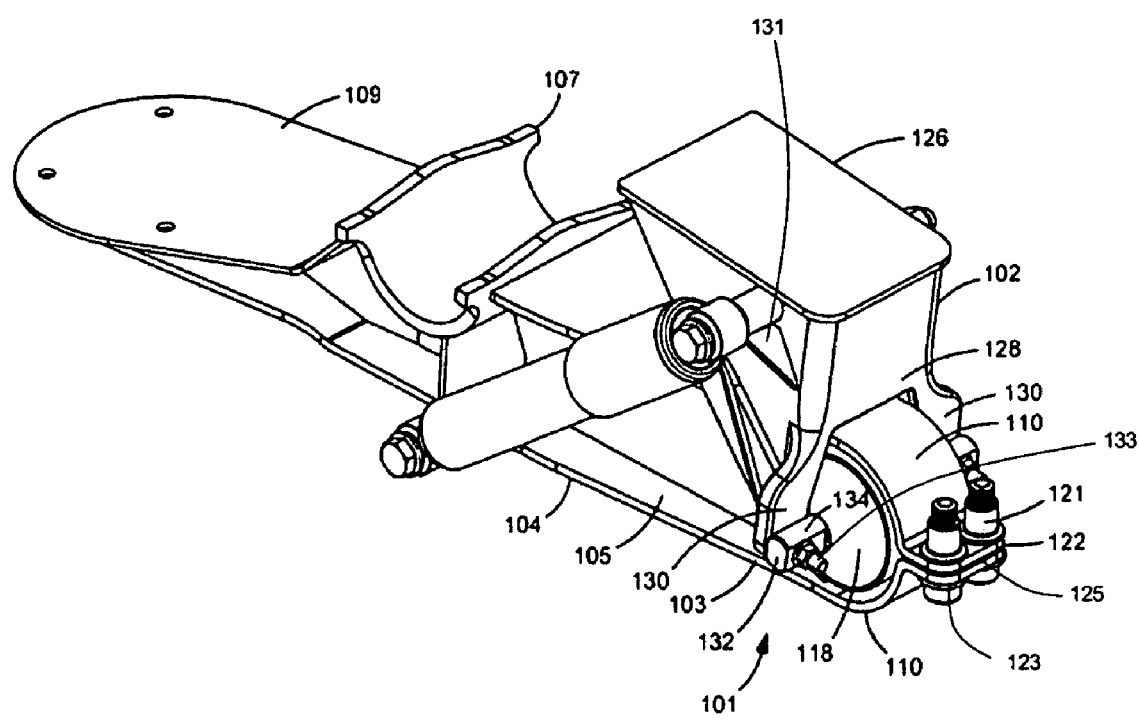
FIG. 1 is a perspective view of a vehicle suspension control arm showing the bar pin bush fastener and bush clamp, according to an embodiment.
Figure 2:
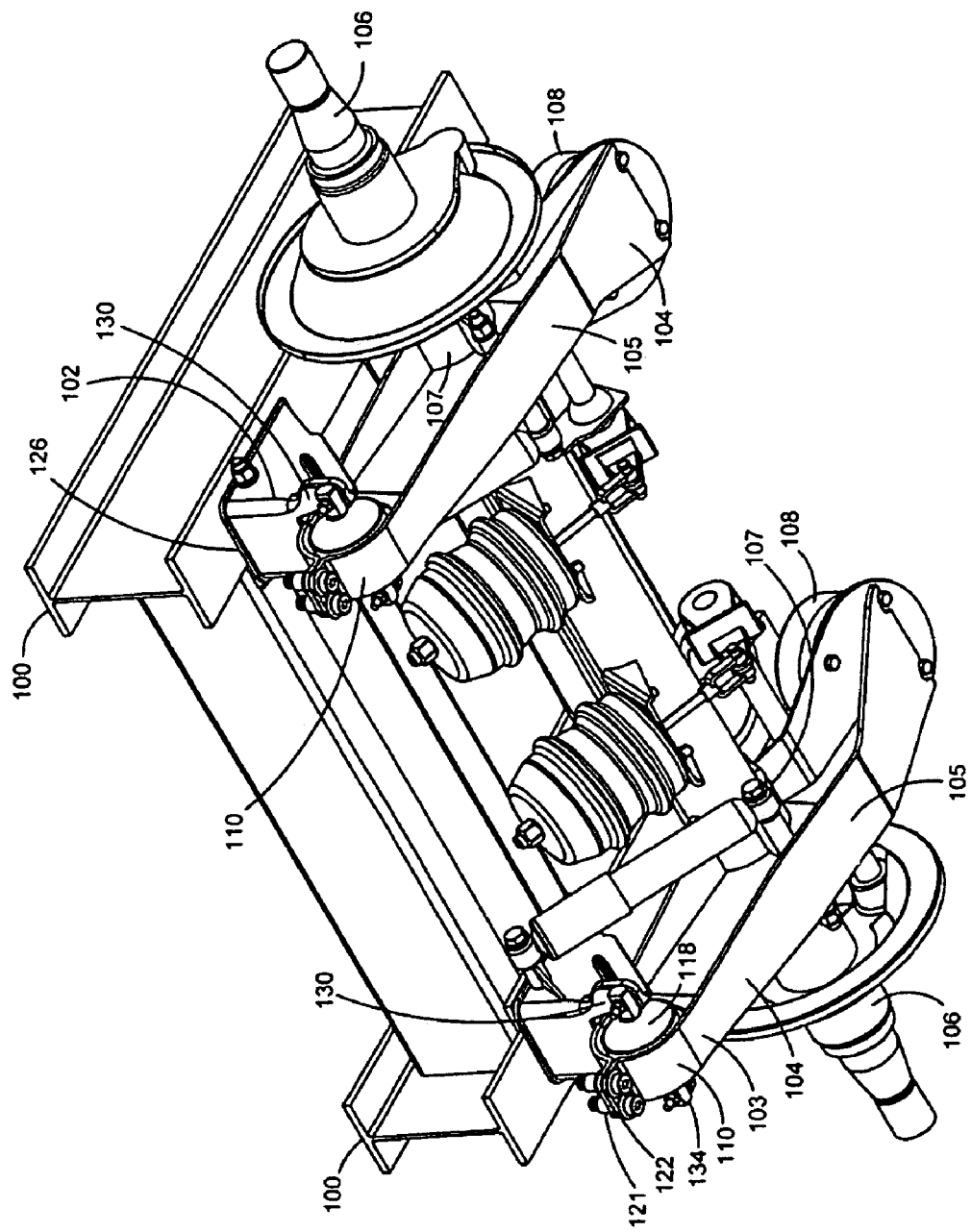
FIG. 2 is an inverted isometric view of the assembled parts of an embodiment of the present invention.

Referring initially to FIGS. 1 and 2, two orientations or views of the present disclosure are presented. FIG. 1 includes a single bar pin attachment for bush assembly. In FIG. 2, a suspension system subassembly is presented. In particular, two bar pin attachments for bush assemblies are shown integrated with various other components of the subassembly well known in the art. Cross-referencing FIGS. 1 and 2, a hanger bracket 102 is shown attached to a vehicle chassis rail 100. A suspension beam or control arm 104, extends longitudinally from the hanger bracket 102 along a mid-region 105 and attaches with an axle mount 107 to a spaced-apart axle 106, preferably by welding or clamping. An air spring 108, or a similar spring mechanism, is mounted between an air spring mount 109, which is fixed to the suspension beam arm 104 at its most rearward position, and the vehicle chassis rail 100. In operation, as the vehicle axle 106 and attached control arm 104 are displaced, the air spring 108 will deflect and absorb the shock of the control arm movement while the control arm 104 simultaneously pivots about the hanger bracket 102. The control arm 104 can be cast or formed with various cross-sectional shapes, such as a closed cross-section (e.g., circular or boxed), or an open cross-section such as a U-shape.

Considering now the beam and bush attachment assembly 101 of the present invention in greater detail, in at least one embodiment, the assembly 101 comprises the control arm 104 and a bush eye clamp 110 radially attached to a bush end 103 of the control arm 104. The bush eye clamp 110 is provided with opposed compression flanges 122, 123 each having at least one, and preferably two, bores (not shown) for receiving fasteners 121 therethrough. The fasteners 121 are used to bias and close the bush eye clamp 110, thereby securing a pivotal bush 118, typically made of a hyperelastic material, therein.

In one embodiment, as shown in FIG. 2, bush eye clamp 110 is positioned such that it is in substantially transverse alignment with the control arm 104 and substantially parallel to the axle 106. The bush eye clamp 110 may be a hollow cylindrical body having an annular cross section and center bore such that the cylindrical bush 118 is slidingly received therein. However, if bush 118 has a different shape or cross-section, bush eye clamp 110 would have a corresponding cross-section to receive and secure bush 118 in place. It is understood that bush 118 may be compressed within a bush eye rather than clamped.

As shown in both FIG. 1 and FIG. 2, compression flanges 122, 123 abut each other in a mating relationship as fasteners 121 are inserted through the fastener bores. Preferably, fasteners 121 are bolts with corresponding nuts, however, any suitable fastener may be used so long as such fastener can substantially close the axial slot 125 of the bush eye clamp 110 and bias the clamp toward bush 118. Field or rapid replacement of bush 118 is easily accomplished with ordinary tools and inexpensive fasteners that reduce vehicle down time and maintenance costs.

In the assembly of the suspension beam and bush attachment of the present disclosure, as shown in FIGS. 1 and 2, a properly sized and shaped bush 118 is slid into the bush eye clamp 110 and clamped into place by securing fasteners 121, as described above. The bush eye clamp 110 "subassembly" is then positioned within the hanger bracket 102. In one embodiment, the hanger bracket 102 includes a mounting base 126 which is fastened directly to the vehicle chassis rail 100 and a downward depending bush receiver 128. It is understood that the mounting base 126 may be integral the hanger bracket 102 or eliminated entirely for a direct connection of the hanger bracket 102 to the chassis rail 100.

Referring for a moment to FIG. 1, the bush receiver 128 includes a pair of spaced-apart flanges 130 extending generally downward on either side of the bush eye clamp 110. Also, hanger bracket 102 may include at least one gusset 131 extending at an angle from the flanges of flange pair 130. In at least one embodiment, each spaced-apart flange of flange pair 130 is slightly longer, extending in a substantially vertical direction, than the radius of the corresponding bush 118. In one embodiment, the bush 118 includes an integral bar pin 132 fixed laterally therethrough during the molding or forming process. By molding the bar pin 132 within the bush 118, wear and tear on the bush 118 is diminished. In particular, reduction of the lateral and torsional movement, which is generally present when a pin is loosely fit within a bush bore, is achieved. It should be understood that in one embodiment, bar pin 132 may be inserted axially through the center of the bush 118 in contrast to the integral bush/bar pin assembly disclosed above.

The provided bar pin 132 is typically longer than the width of the bush 118. As such, both ends of the bar pin 132, e.g. end 134, extend beyond the lateral face of the bush 118, preferably near an outer edge of each flange of pair 130. Each bar pin end 134 is positioned adjacent one of the suspension hanger flanges of flange pair 130 and fastened thereto. As shown in FIG. 1, the bar pin end 134 may be secured directly to the flanges of pair 130 by securing a bolt 133, or similar fastener through both the bar pin end 134 and the flange. The flange may be provided with a threaded stud which then passes through the bar pin 132 and is secured with a counter threaded nut.

Figure 3:
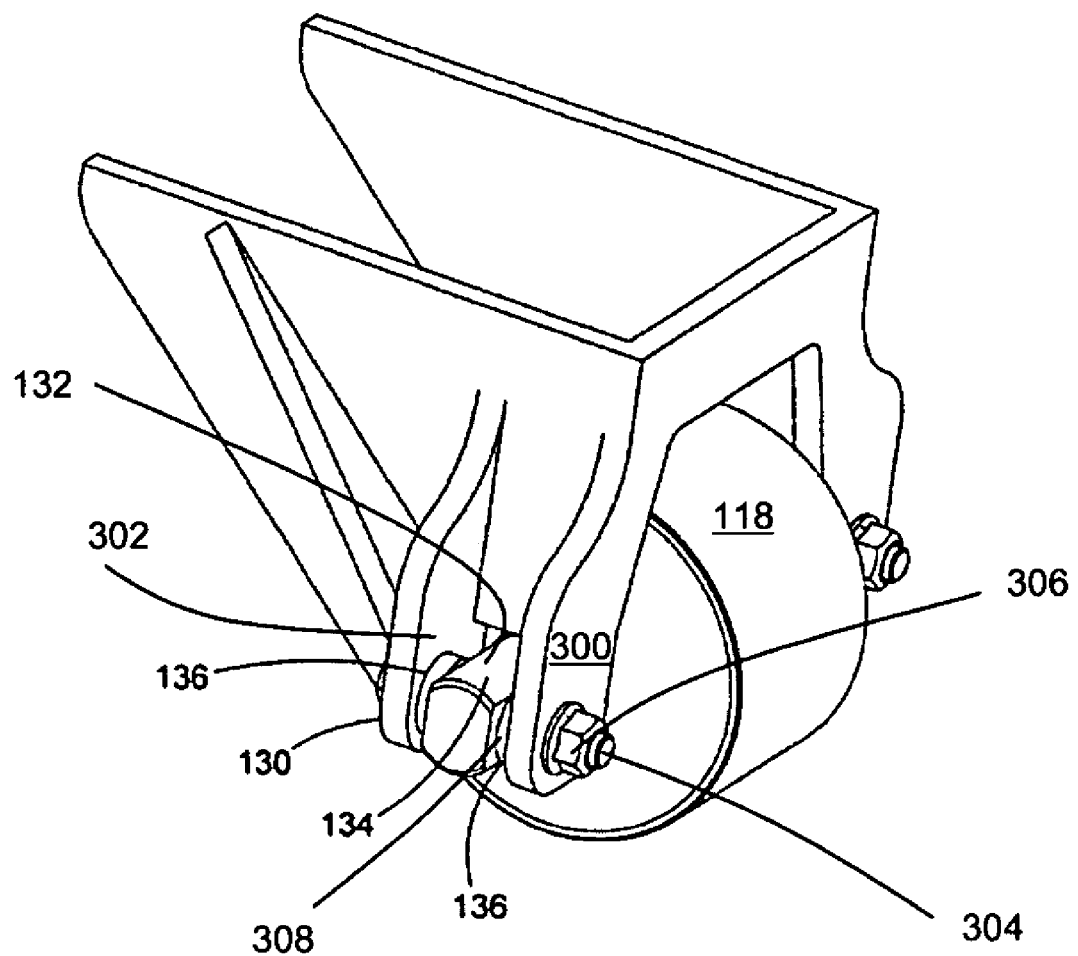
FIG. 3 is a perspective view of a bar pin attachment for bush assembly having flange tabs shimmed for axle alignment, according to an embodiment.

In another embodiment of the present disclosure, as shown in FIG. 3, each flange of flange pair 130 further comprises a forward flange tab 300 and a spaced apart rearward flange tab 302. The bar pin end 134 is positioned intermediate the forward 300 and rearward 302 flange tabs and fastened therebetween with bolts or other fastening devices e.g. bolt 304 and nut 306. Shims 308 may be used between either depending flange tab 300, 302 and the bar pin end 134 to adjust axle 106 (FIG. 2) alignment. This assembly further reduces wear on the bar pin 132, bush 118 and fasteners 304 by stabilizing the bush/bar pin connection to the suspension hanger bracket 102 (FIGS. 1 and 2) during suspension movement.

Figure 4:
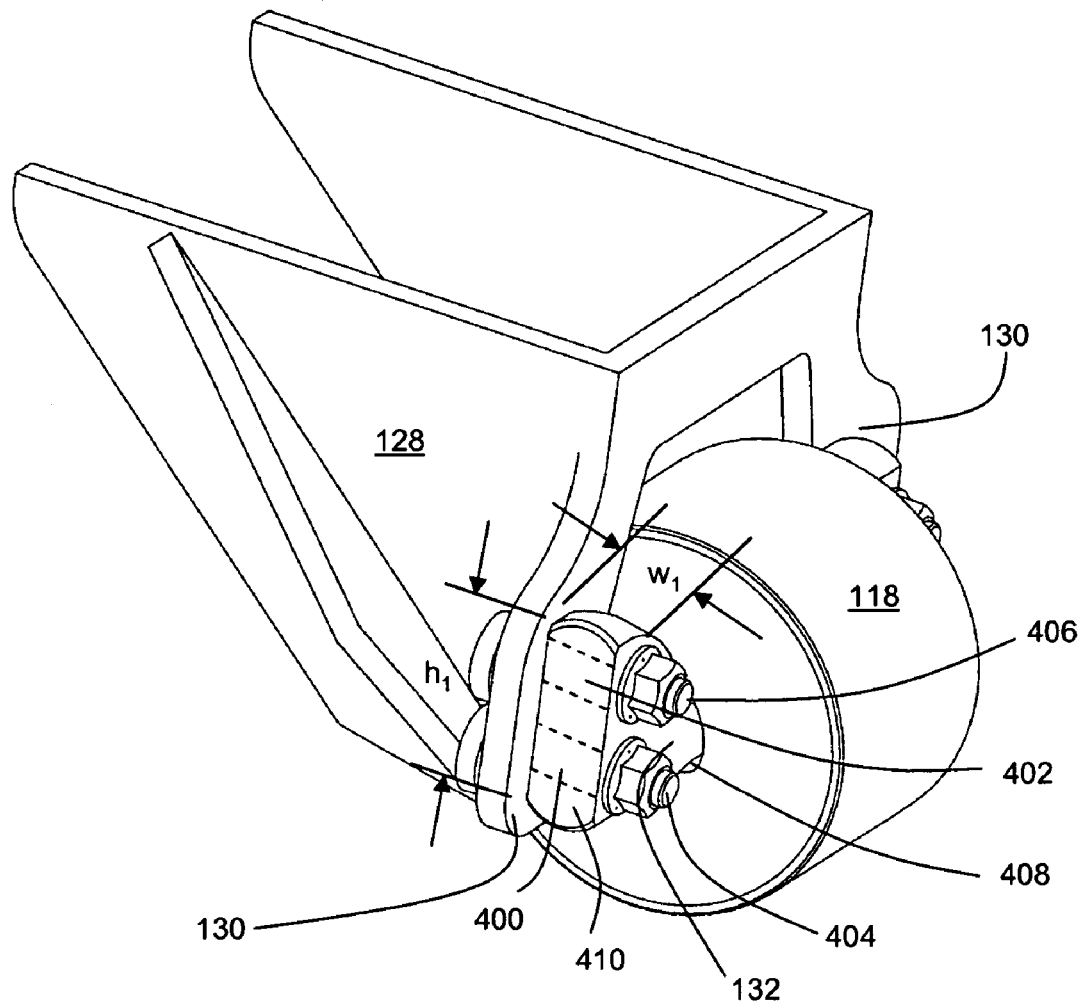
FIG. 4 is a perspective view of a bar pin attachment for bush assembly having a bar pin with flared post, according to an embodiment.

Referring now to FIG. 4, yet another embodiment of the present invention is presented. Similar to the embodiment presented in FIGS. 1 and 2, each flange of flange pair 130, of bush receiver 128, is a singular piece which includes one or more bore holes, e.g. bore holes 400 and 402, for receipt of fasteners, e.g. fasteners 404 and 406 respectively. As shown in FIG. 4, bar pin 132 is positioned through an aperture 408 in bush 118, and mounted to each flange 130 using any of a number of techniques well known in the art. Bar pin 132 may include a flared post 410 at each end of the pin 132, the height "$h_f$" and/or width "$w_f$" of which typically exceeds the diameter of aperture 408. It can be appreciated that flared post 410 may be formed as part of bar pin 132 during the manufacturing process. Alternatively, flared post 410 may be secured to bar pin 132 subsequent to the positioning of bar pin 132 within aperture 408. In this instance, flared post 410 may be welded or fastened to bar pin 132 using mechanical fastening techniques known to the skilled artisan. Also, in one embodiment, bar pin 132 is formed or molded as part of bush 118, which is to say integral thereto.

Having specifically described illustrative embodiments of the invention with reference to the accompanying drawings, it is to be understood that the invention is not limited to those precise embodiments and that various changes and modifications may be effected therein by one skilled in the art without departing from the scope and spirit of the invention as defined in the appended claims. The following claims are intended to cover all generic and specific features described herein, as well as all statements of the scope of the present method, device and structure, which, as a matter of language, might be said to fall therebetween.

What is claimed is:

1. A bar pin attachment for bush assembly comprising:
 a control arm;
 a bush;
 at least one bush eye clamp transversely mounted to the control arm, wherein the bush is compressively fit within a center bore of the bush eye clamp, the bush eye clamp contacting and compressing a perimeter of the bush;
 a suspension hanger assembly attached to and depending from a vehicle chassis, the suspension hanger further comprising a pair of spaced-apart flanges between which the bush eye clamp is positioned for mounting;
 a bar pin inserted axially through the bush, wherein the bar pin has a first end and a second end, the first and second end each provided with at least one bore for receiving a fastener to fasten the bar pin to the pair of spaced-apart flanges.

2. The bar pin attachment for bush assembly of claim 1, wherein the bush eye clamp includes one or more flanges having a bore for receiving a fastener therein, to bias the bush eye clamp into a substantially closed position in contact with the bush.

3. The bar pin attachment for bush assembly of claim 1, further comprising at least one threaded stud for fastening the bar pin to the pair of spaced-apart flanges.

4. The bar pin attachment for bush assembly of claim 1, wherein the hanger bracket includes at least one gusset extending at an angle from the flanges.

5. The bar pin attachment for bush assembly of claim 1, wherein each flange of the pair of spaced-apart flanges further comprises a forward flange tab and a rearward flange tab, and further wherein the bar pin end is fastened intermediate the forward flange tab and rearward flange tab.

6. The bar pin attachment for bush attachment of claim 5, further comprising one or more shims selectively inserted between the forward flange tab and the bar pin end to adjust axle alignment.

7. The bar pin attachment for bush assembly of claim 5, further comprising one or more shims selectively inserted between the rearward flange tab and the bar pin end to adjust axle alignment.

8. The bar pin attachment for bush assembly of claim 1, wherein each of the first and the second end of the bar pin includes a flared post.

9. The bar pin attachment for bush assembly of claim 1, wherein the bar pin is integral to the bush.

10. The bar pin attachment for bush assembly of claim 7, wherein the bar pin is molded laterally through the bush.

11. An improved suspension hanger assembly of the type in which a control arm is connected to a suspension hanger, the improvement comprising:
 a bush;
 at least one bush eye clamp transversely mounted to the control arm, wherein the bush is compressively fit within a center bore of the bush eye clamp, the bush eye clamp contacting and compressing a perimeter of the bush;
 a pair of spaced-apart flanges integral to the suspension hanger, between which the bush eye clamp is positioned for mounting;
 a bar pin inserted axially through the bush, wherein the bar pin has a first end and a second end, the first and second end each provided with at least one bore for receiving a fastener to fasten the bar pin to the pair of spaced-apart flanges.

12. The improved suspension hanger assembly of claim 11, wherein the bush eye clamp includes one or more flanges having a bore for receiving a fastener therein, to bias the bush eye clamp into a substantially closed position in contact with the bush.

13. The improved suspension hanger assembly of claim 11, wherein each flange of the pair of spaced-apart flanges further comprises a forward flange tab and a rearward flange tab, and further wherein the bar pin end is fastened intermediate the forward flange tab and rearward flange tab.

14. The improved suspension hanger assembly of claim 11, wherein each of the first and the second end of the bar pin includes a flared post.

15. The improved suspension hanger assembly of claim 11, wherein the bar pin is integral to the bush.

16. A bar pin attachment for bush assembly comprising:
- a longitudinally extending control arm having a bush end, a mid-region, and an axle mount formed on a side of the mid-region opposite the bush end;
- a bush eye clamp formed at the bush end of the control arm with a hollow bore extending transversely therethrough for receiving a bush, the clamp having a fixed end attached to the control arm;
- a bar pin;
- a suspension hanger depending from a vehicle chassis which further comprises a pair of spaced-apart and downward depending flanges, between which the bush eye clamp is pivotally attached by inserting the bar pin axially through the bush and fastening the bar pin to the spaced-apart flanges.

17. The bar pin attachment for bush assembly of claim 16, wherein each flange of the pair of spaced-apart and downward depending flanges further comprises a forward flange tab and a rearward flange tab, and further wherein the bar pin end is fastened intermediate the forward flange tab and rearward flange tab.

18. The bar pin attachment for bush assembly of claim 16, wherein each of the first and the second end of the bar pin includes a flared post.

19. The bar pin attachment for bush assembly of claim 11, wherein the bar pin is integral to the bush.

20. The bar pin attachment for bush assembly of claim 17, wherein the bar pin is molded laterally through the bush.

* * * * *